United States Patent

Greenawalt

[15] 3,689,083

[45] Sept. 5, 1972

[54] SEALING RING RETENTION DEVICE

[72] Inventor: Robert Gordon Greenawalt, Barrington, R.I.

[73] Assignee: Sealol, Inc., Warwick, R.I.

[22] Filed: April 28, 1971

[21] Appl. No.: 138,080

[52] U.S. Cl. ............................... 277/40, 277/DIG. 9
[51] Int. Cl. ........................... F16j 15/40, F16j 15/54
[58] Field of Search .......... 277/40, 39, 86, 87, DIG. 9

[56] References Cited

UNITED STATES PATENTS

| | | | |
|---|---|---|---|
| 3,592,479 | 7/1971 | Andresen | 277/40 |
| 3,578,344 | 11/1969 | Yost | 277/40 |
| 3,245,692 | 4/1966 | Voitik | 277/40 |

*Primary Examiner*—Samuel B. Rothberg
*Attorney*—Ralph L. Cadwallader and Leo M. Kelly

[57] ABSTRACT

A sealing ring retention device for use in rotary mechanical fluid seals subjected to high fluid pressure and/or high temperature environments and including a vibration damping disk and anti-rotational structural features.

4 Claims, 10 Drawing Figures

Patented Sept. 5, 1972

INVENTOR.
ROBERT GORDON GREENAWALT

BY
William Frederich Ikerner
ATTORNEY

Patented Sept. 5, 1972
3,689,083
2 Sheets-Sheet 2
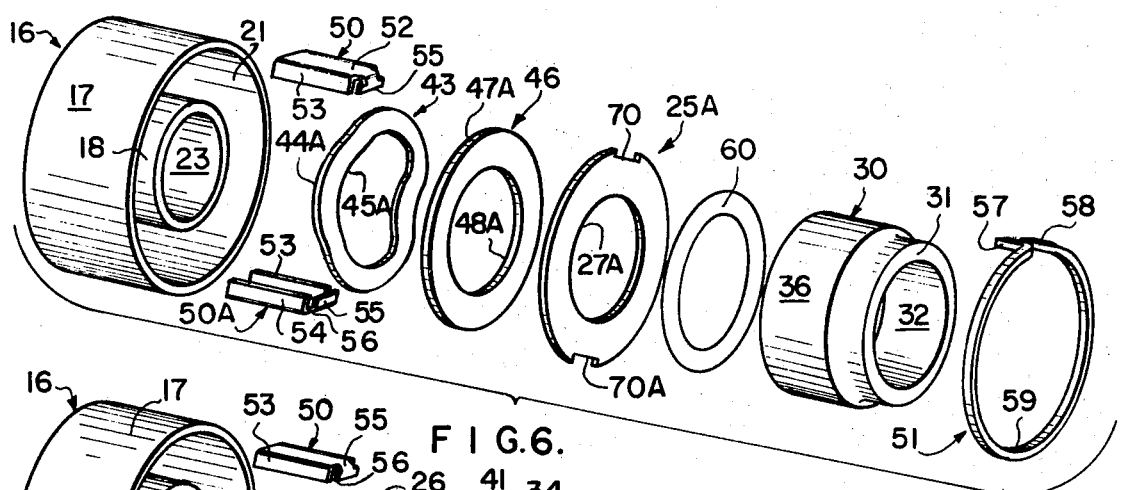
FIG. 6.
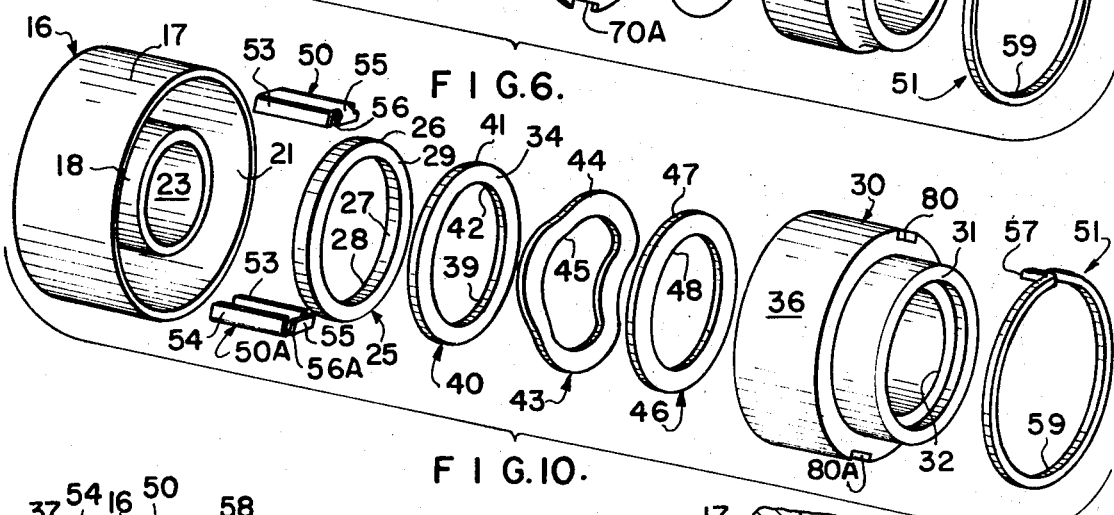
FIG. 10.
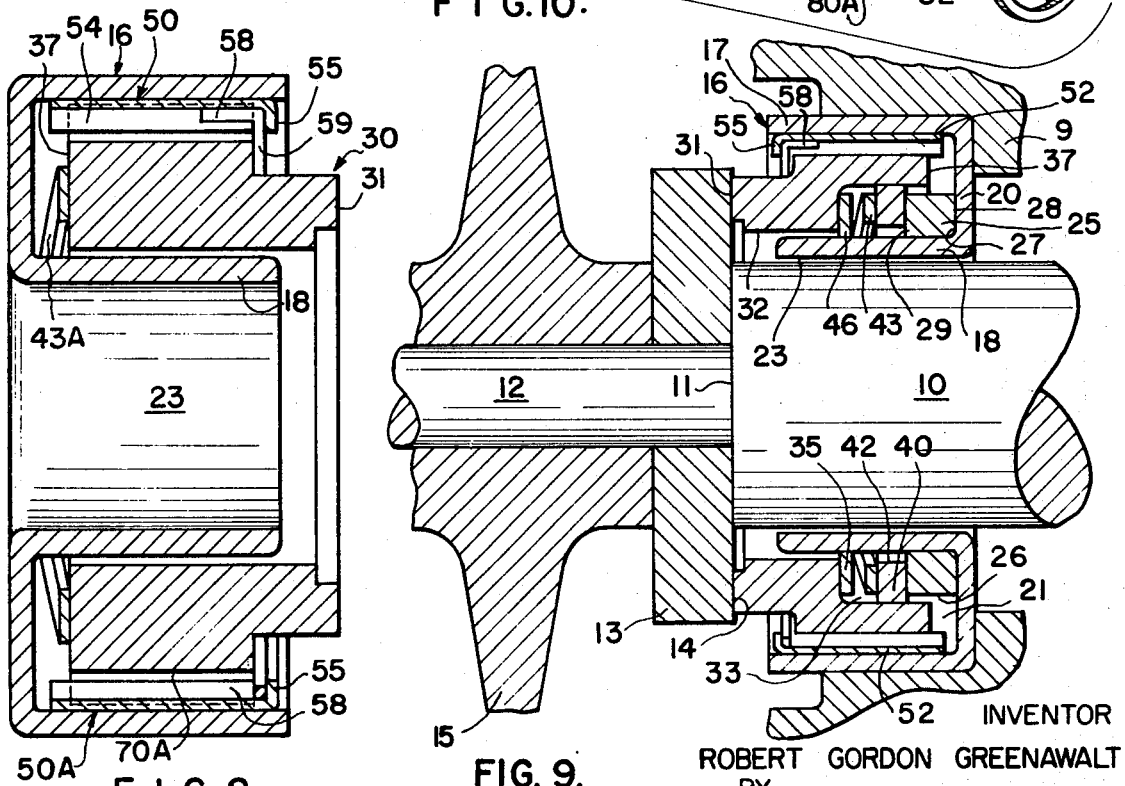
FIG. 8.
FIG. 9.
INVENTOR
ROBERT GORDON GREENAWALT
BY
William Frederick Ikeme
ATTORNEY

SEALING RING RETENTION DEVICE

The present invention relates to a sealing ring retention device for use with rotary mechanical fluid seals of the type used for effecting a fluid tight seal between a rotating mating ring and a stationary sealing ring face and more particularly with retaining a secondary sealing element and its associated parts within a housing including new structional features consisting of a vibration damping disk and an anti-rotational device.

An object of the present invention is to provide a retention device in association with a primary sealing ring for retaining a secondary sealing ring within a housing to provide a unitary structure which can be transported and inserted in a shaft housing, such as a pump housing.

Another object of the present invention is to provide a sealing ring retention device with a anti-rotational structural feature to prevent the primary fluid tight stationary sealing ring from rotating within its housing or in relation to the secondary fluidtight sealing structure.

And still another object of the present invention is to provide a sealing ring retention device with a vibration damping disk whereby vibration created in the stationary sealing ring is absorbed by the damping disk.

In environments where fluids are pumped or otherwise circulated it has long been a practice to seal the rotary shaft which is a part of the pumping or circulation apparatus by utilizing a mechanical seal.

Commonly, the shaft extends from the zone of the fluid to a zone outwardly therefrom in the atmosphere and for rather obvious reasons, excessive fluid flow across the shaft from the fluid zone to the atmospheric zone is undesirable.

The aforementioned mechanical seals, conventionally, take the form of a rotary member supported on the rotating shaft. The rotary member being provided with a mating face. The rotary member being one of the interfaces which form a fluidtight joint between a stationary element and the rotating member.

The stationary element is normally fixed in the pump housing and is provided with a secondary sealing element which forms a fluidtight joint between the housing and the stationary element.

The secondary sealing element may take several forms. One form in the nature of an O ring is illustrated in FIG. 1. A second form, wherein a secondary sealing ring provides one element of an interface, and cooperates with a spacing collar, is illustrated in FIG. 7.

In either event, when the sealing ring forms part of a secondary structure, it becomes necessary to retain that secondary structure within a housing so that the sealing element can be transported and installed in a pump casing as an integral unit whose parts can be readily replaced for wear.

Accordingly, it is an object of the present invention to provide a sealing ring retention device which will increase the sealing efficiency of a secondary sealing element.

Other objects of the present invention will be pointed out in part and become apparent in part in the following specification and claims.

Referring to the drawings in which characters of reference indicate corresponding parts:

FIG. 6 is an exploded perspective view showing the structural elements assembled in FIG. 1.

FIG. 8 is a view similar to FIG. 1, showing another modified form of rotary mechanical fluid seal construction incorporating the present invention.

FIG. 9 is a view similar to FIG. 1, showing still another modified form of rotary mechanical fluid seal construction incorporating the present invention.

FIG. 10 is an exploded perspective view showing the structural elements assembled in FIG. 9.

Figure 1:
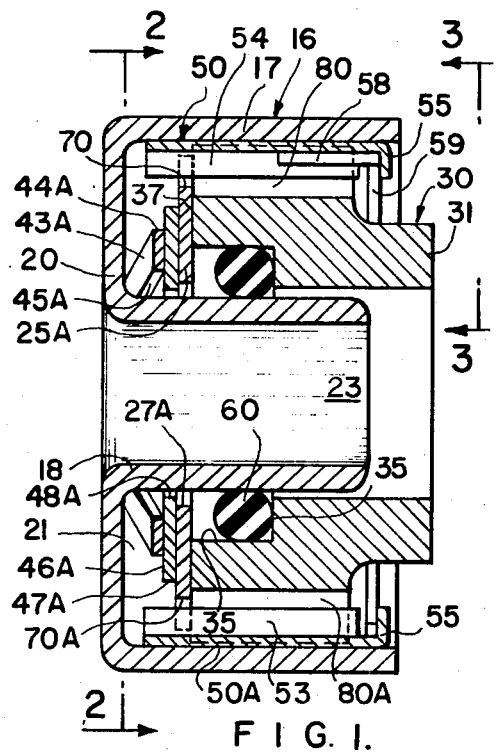
FIG. 1 is a vertical cross sectional view through a rotary mechanical seal showing the structural features of the present invention.
Figure 2:
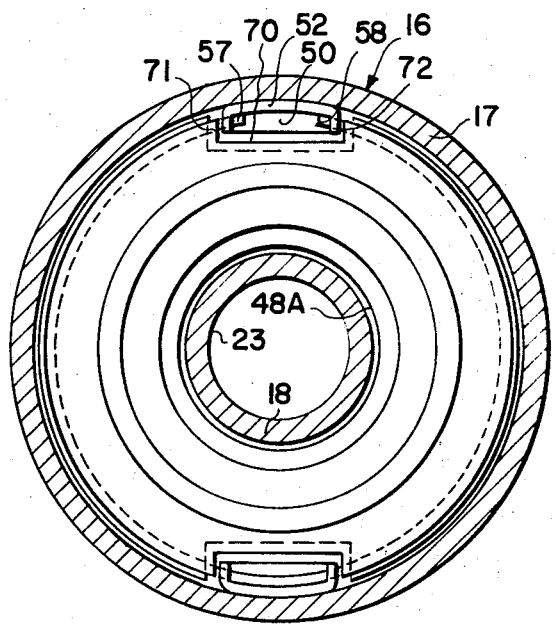
FIG. 2 is a cross sectional view taken on line 2—2 of FIG. 1.

In proceeding with this invention reference is directed to the drawings, wherein is illustrated the present sealing ring retention device as applied to the sealing ring element of a rotary mechanical fluid seal forming a structural part of a secondary sealing unit removably retained in a housing.

FIG. 9 shows a rotary mechanical fluid seal unitary structure, generally indicated by reference numeral 16, housing the primary sealing ring and secondary sealing element supported in a pump casing 9 and surrounding a pump shaft 10. The shaft 10 may be provided with a reduced diameter 12 forming a shoulder 11. A rotary member 13 provided with a mating face 14 is fixed to the reduced diameter 12, as by a drive fit, and abut's shoulder 11. A pump impaller 15 may be fixed to shaft 10.

The unitary structure or housing 16 consists of an outer shell 17, an inner shell 18 and a back wall 20 integrally connected to both the outer shell 17 and inner shell 18 to provide a chamber 21. Inner shell 18 forms a shaft opening 23 through which shaft 10 freely passes.

A spacing collar, generally indicated by reference numeral 25, provided with an outside diameter 26, an inside diameter 27, a rear surface 28 and a front surface 29 is fastened to inner shell 18 by means of a "-drive fit" with rear surface 28 abutting back wall 20. The "drive fit" provides a fluidtight seal between inside diameter 27 and inner shell 18.

A primary sealing ring, generally indicated by reference numeral 30, is provided with a forwardly protruding annular sealing face 31, an axial bore 32, a circular recess 33 having a vertical wall 35, an enlarged outside surface 36, a rear wall 37 and two key ways 80, 80A.

A secondary sealing ring 40 is provided with an outside surface 41, an inside surface 42, a rear surface 39 and a front surface 34.

A wavy circular spring 43 is provided with a circumference 44 and an axial opening 45. A back up washer 46 is provided with an outside surface 47 and a circular 48.

Figure 5:
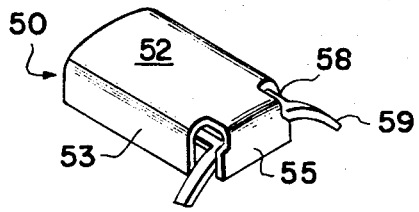
FIG. 5 is an assembled view, in perspective of the detailed structure of FIG. 4.
Figure 3:
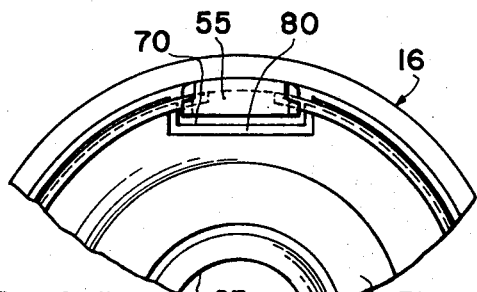
FIG. 3 is an enlarged fragmentary view taken on line 3—3 of FIG. 1.
Figure 4:
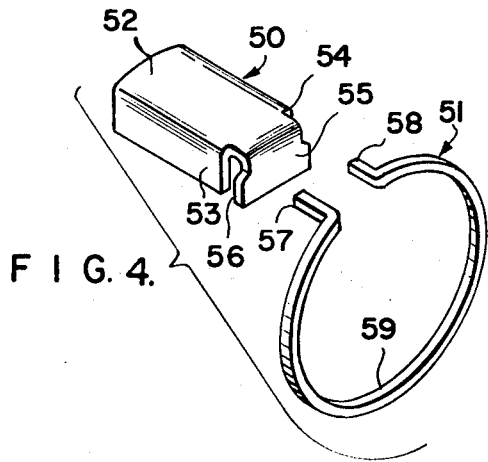
FIG. 4 is an exploded perspective view in detail of the new and improved sealing ring retention device.

The new and improved sealing ring retention device shown in detail in FIGS. 4 and 5, comprises an anti-rotation key 50 and a locking ring 51.

Key 50 consists of base 52, having depending parallel sides 53, 54 and a depending end 55 which forms a channel 56 in cooperation with parallel sides 53, 54.

Locking ring 51 is an open ended wire loop body with the opposite ends 57, 58 formed at right angles to the loop body 59 and parallel to each other.

In assembling the several parts, two keys 50 are fastened to outer shell 17, as by welding, and preferably diametrically opposite each other, within chamber 21 and with base 52 attached to the inner surface of shell 17. Spacing collar 25 is drive fitted into position around inner shell 18 and against back wall 20 to thereby, be located in chamber 21.

Back-up washer 46 is placed in circular recess 33 abutting vertical wall 35 with outside surface 47 spaced away from circular recess 33 to allow for outward thermal expansion of washer 46. Wavy circular spring 43 is placed in circular recess 33 abutting back up washer 46 with circumference 44 spaced away from circular recess 33. Secondary sealing ring 40 is paced in circular recess 33 and is provided with an outside surface 41 larger in diameter than the diameter of circular recess 33, thereby, to provide a "squeeze fit" and a fluidtight seal between outside surface 41 and circular recess 33. This "squeeze fit" however, provides for relative sliding movement between circular recess 33 and outside surface 41. Sealing ring 40 abuts wavy circular spring 43. The several parts are placed in chamber 21 with rear surface 39 abutting front surface 29 on spacing collar 25 in fluidtight relationship.

Locking ring 51 is then placed in seal ring retaining position by placing the area of body 59 diametrically opposite to ends 57, 58 in channel 56A with the tops of the loop adjacent ends 57, 58 in channel 56 and with opposite ends 57, 58 located against depending walls, 53, 54 respectively. In this manner sealing ring 30 and the component parts of the secondary sealing element are removably secured within chamber 21 of housing 16 with key way 80, 80A operatively engaging keys 50, 50A.

FIG. 1 shows a modified form of rotary mechanical fluid seal provided with the new and improved sealing ring retention device.

The unitary structure or housing 16 is constructed exactly as previously described.

The primary sealing ring 30 is constructed exactly as previously described.

In place of the spacing collar 25 and secondary sealing ring 40; an O-ring 60 is provided as a substitute secondary sealing element. However, a substitute spacing collar 25A is provided in the form of a vibration damping disk or collar fabricated from resilient material having vibration absorbing characteristics. Any rubber or synthetic rubber or elastomeric type material inherently possesses the necessary resilient and vibration absorbing characteristics.

Vibration damping collar 25A is provided with an inside diameter or axial bore 27A larger in area than the outside diameter of inner shell 18. Two diametrically opposite key slots are provided consisting of a base, respectively, 70, 70A and two opposite and parallel, respectively, sides 71, 72 and 71A, 72A, respectively, are aligned in anti-rotation position with respect to sides 53, 54, and 53A, 54A, respectively.

An O-ring is placed in position within circular recess 33 and against vertical wall 35. The key ways 80, 80A in primary sealing ring 30 are aligned with keys 50, 50A. Sealing ring 30 is then placed within chamber 21 so that the back surface 37 of ring 30 butts against vibration damping collar 25A with O-ring 60 engaging inner shell 18 in fluidtight relationship.

Locking ring 51, is then placed in position as previously described.

It will be observed, that sealing ring 30, O-ring 60, vibration damping collar 25A, back up washer 46A and spring 43A are all held within chamber 21 by means of locking ring 51.

That keys 50, 50A prevent sealing ring 30 from rotating in relation to housing 16 and that vibration damping collar 25A will absorb vibration located in sealing ring 30. Spring 43A urges washer 46A against vibration damping collar 25A and Collar 25A against rear surface 37 so that sealing face 31 is urged against mating face 14 on rotary member 13.

Figure 7:
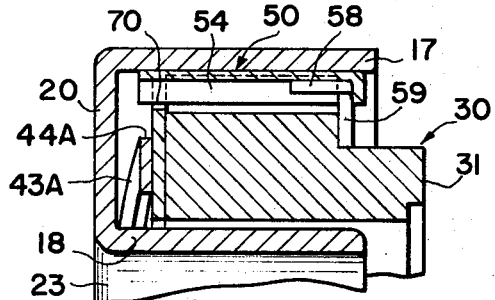
FIG. 7 is a view similar to FIG. 1 showing a modified form of rotary mechanical fluid seal incorporating the present invention.

Reference is now made to FIG. 7, wherein is illustrated, a fragmentary cross sectional view of a modified form of construction shown in FIG. 1, 2, 3, 4, 5 and 6. The back-up washer 46A and O-ring construction shown in Fig. 1 is eliminated in FIG. 7. In this construction wavy spring 43A directly engages vibration damping collar 25A.

In all other structural features and functions the specie of FIGS. 1, 2, 3, 4, 5 and 6 is the same as the specie shown in FIG. 7.

FIG. 8 illustrates a vertical cross-sectional view of a modified form of construction shown in FIG. 7. In FIG. 8 the vibration damping collar 25 shown in FIG. 7, is eliminated. The wavy spring 44A is interposed between back wall 20 and back surface 37. In all other structural features and functions the specie of FIG. 7 is the same as the specie shown in FIG. 8.

What I claim is:

1. A sealing ring retention device, adapted to cooperate with a stationary sealing ring assembly forming part of a rotary mechanical fluid seal, consisting of a housing having an inner shell provided with a shaft opening, an outer shell, and a back wall integrally connected to both the inner shell and outer shell to provide a chamber, a primary sealing ring provided with a forwardly protruding annular sealing face, an axial bore, and an enlarged outside surface having a pair of key slots, resilient means interposed between said back wall and said primary sealing ring urging said primary sealing ring away from said back wall, a sealing ring retention device comprising a pair of keys, each key having a base and two upstanding parallel sides and an upstanding end forming a channel in cooperation with said two upstanding parallel sides, means fastening each key to said outer shell and within said chamber, with said pair of key slots surrounding, respectively, said pair of keys to prevent said primary sealing ring from rotating in relation to said housing, and a locking ring having an open ended wire loop body with the opposite ends formed at right angles to the loop body and parallel to each other, the loop body being located in the channel of one of said pair of keys, the open end of the wire loop being located in the channel of the other of said pair of keys with opposite ends located within the last mentioned key and between the two upstanding parallel sides, thereby, to secure the locking ring within said pair of keys to prevent said primary sealing ring from moving out of said chamber.

2. A sealing ring retention device, adapted to cooperate with a stationary sealing ring assembly forming part of a rotary mechanical fluid seal according to claim 1 in which a vibration damping collar is provided with an axial bore and a pair of key slots, said vibration damping collar being interposed between said primary sealing ring and said resilient means with said last mentioned pair of key slots, respectively, surrounding said pair of keys, and with said axial bore surrounding said inner shell.

3. A sealing ring retention device, adapted to cooperate with a stationary sealing ring assembly forming part of a rotary mechanical fluid seal according to claim 2 in which said primary sealing ring is provided with a circular recess, and a secondary sealing means located within said circular recess and around said inner shell.

4. A sealing ring retention device, adapted to cooperate with a stationary sealing ring assembly forming part of a rotary mechanical fluid seal, consisting of a housing having an inner shell provided with a shaft opening, an outer shell, and back wall integrally connected to both the inner shell and outer shell to provide a chamber, a spacing collar having an inside diameter, and a front surface, means fastening said spacing collar to said inner shell in fluidtight relationship, a primary sealing ring provided with a forwardly protruding annular sealing face, an axial bore, a circular recess, a vertical wall and an enlarged outside surface having a pair of key slots, a back up washer having an outside surface and a circular opening said washer being located in said circular recess abutting said vertical wall with said circular opening surrounding said inner shell; a wavy circular spring having an axial opening surrounding said inner shell and abutting said back up washer, a secondary sealing ring having an outside surface, an inside surface, and a rear surface, said sealing ring being located in said circular recess with said outside surface engaging said circular recess and with said rear surface engaging said front surface in fluid tight relationship, said wavy circular spring urging said forwardly protruding annular sealing face away from said back wall, and a sealing ring retention device comprising a pair of keys, each key having a base and two depending parallel sides and a depending end forming a channel in cooperation with said two depending parallel sides, means fastening each key to said outer shell with said pair of key slots surrounding said pair of keys, respectively, to prevent said primary sealing ring from rotating in relation to said housing, and a lock ring located in said pair of keys to retain said primary sealing ring in said housing.

* * * * *

PO-1050
(5/69)

UNITED STATES PATENT OFFICE
CERTIFICATE OF CORRECTION

Patent No. 3,689,083              Dated    September 5, 1972

Inventor(s) Robert Gordon Greenawalt

It is certified that error appears in the above-identified patent and that said Letters Patent are hereby corrected as shown below:

Column 1, line 12, after "sealing" insert --element functionally operative with said primary sealing--.

Column 3, line 17, delete "paced" and insert --placed--.

Signed and sealed this 29th day of May 1973.

(SEAL)
Attest:

EDWARD M. FLETCHER, JR.                ROBERT GOTTSCHALK
Attesting Officer                      Commissioner of Patents